March 7, 1961 J. O. SMILEY 2,973,842
FRICTION ELEMENT
Filed July 6, 1956

INVENTOR.
JAMES O. SMILEY
BY
ATTORNEY

United States Patent Office 2,973,842
Patented Mar. 7, 1961

2,973,842

FRICTION ELEMENT

James O. Smiley, Dayton, Ohio, assignor to General Motors Corporation, Detroit, Mich., a corporation of Delaware Filed July 6, 1956, Ser. No. 596,266

4 Claims. (Cl. 188—251)

This invention relates to friction elements and is particularly concerned with metallic friction elements for use in brakes, clutches and the like.

It is the main object of the invention to provide a friction element which has the desired frictional characteristics and yet is sufficiently ductile and strong to permit attachment thereof to elements of a mechanical combination, for example, a brake or clutch.

In carrying out the above object, it is another object of the invention to provide a composite, laminated friction element having a sintered surface or layer which provides the desired friction and wear characteristics together with a coextensive layer of a different sintered metallic material which is relatively more ductile and stronger and which provides a medium for attaching the friction element to a machine element in the brake or clutch combination in either flat or arcuate form.

Specifically, the invention is directed to a sintered, ferrous friction element which includes a friction layer having a substantial percentage of graphite, which friction layer is juxtaposed and coextensively bonded to a layer of a more ductile material such as a ferrous material having substantially less graphite therein whereby the element may be riveted or otherwise attached to an element of a brake or clutch combination through the more ductile layer and may also be conformed to some degree to the contour of the machine element.

Figure 4:
Figure 5:
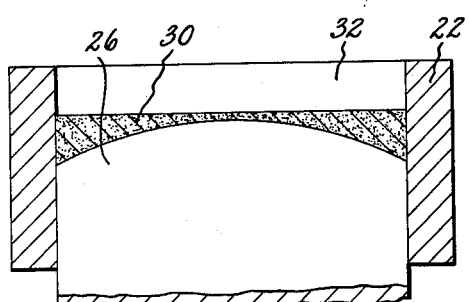
Figure 5:
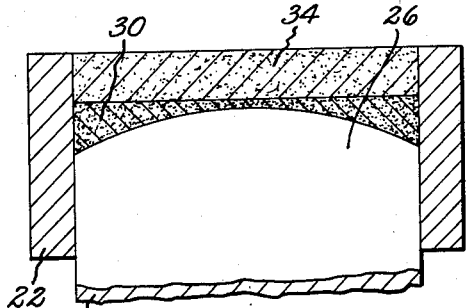
Figure 5:
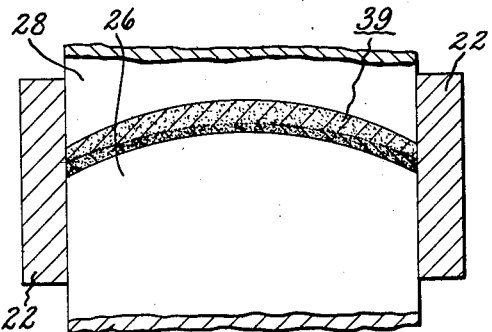
Figure 6:
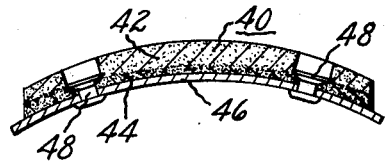

Further objects and advantages of the present invention will be apparent from the following description, reference being had to the accompanying drawings wherein:

Figures 1 through 5 are diagrammatic views of one type of die which may be used to form the friction element as described herein in the several positions thereof during the filling and briquetting of a friction element; and, Figure 6 is a view of the friction element, as produced by the method disclosed in Figures 1 through 5, attached to a brake shoe through the use of rivets.

Specifically referring to the drawings, an arcuate friction element of composite form may be made by the method and in the tools shown in Figures 1 through 5 which are progressive views of the briquetting die in various stages of the briquetting operation.

Figure 1:
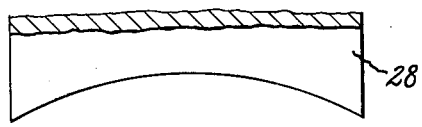
Figure 2:
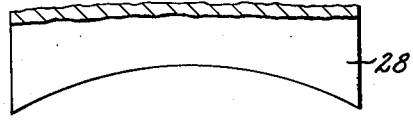
Figure 3:
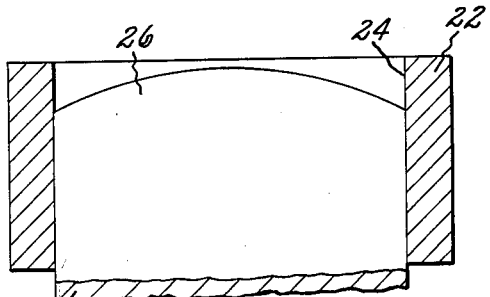
Figure 3:
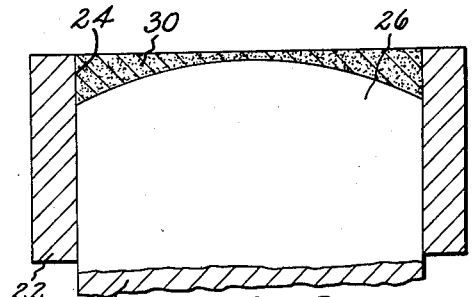
Figure 3:
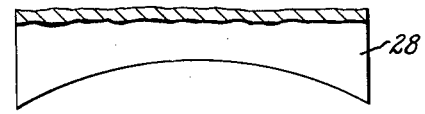

In Figure 1, the female portion of the die 20 is shown at 22. This includes a die cavity 24 which has therein a plunger or lower punch member 26. The upper surface of the punch member 26 is curved in conformation and in the first stage of the operation, is spaced slightly below the top of the die cavity 24 as noted in Figure 1. The upper punch or plunger 28 conforms substantially in shape of the complement of the lower punch 26 allowing for the increased radius of the upper surface of the element. With two punches in the position shown in Figure 1, metal powder is filled into the die cavity as shown in Figure 2 at 30. This powder is scraped off the top of the die to level the quantity thereof which is predetermined and, in this instance, is a mixture of the iron powder with about 2% graphite mixed therethrough. The next step of the process is to cause the lower punch member 26 to be retracted to the position shown in Figure 3. The metal powder layer 30 moves downwardly with the punch and thereby provides a cavity thereover as noted at 32. This cavity is predetermined in volume and is then filled with the friction mixture comprising the iron, graphite and molybdenum disulfide which is then leveled off into a layer 34 as shown in Figure 4. Finally, the upper punch 28 is caused to descend upon the powder mixture and the metal powder in the two layers is briquetted under substantial pressures, for example, in the neighborhood of 60,000–100,000 pounds per square inch, preferably 80,000 pounds per square inch whereupon the layers are compressed into coherent self-sustaining masses in coextensive relation to one another and particles of one layer are caused to intermingle with particles of the other layer at the interface which tends to create a strong mechanical bond therebetween.

It will be noted that due to the fact that the lower punch is curved during the first filling operation, the thickness of the lower layer varies from the center thereof where it is the thinnest to the ends thereof where it is the thickest. Similarly, the thickness of the friction layer varies inversely from the center where it is the thickest to the edges where it is the thinnest. This particular balance between the thicknesses of the layers is useful since the riveting of the shoe is carried out adjacent the ends thereof where the more ductile and stronger lower layer is preferably thicker.

The briquetted part, including the two layers as shown at 39 in Figure 5, is subsequently ejected from the die and placed in a sintering furnace where it is sintered at temperatures in the order of 1800° F. to 2000° F., preferably about 1900° F. for a period from 30 to 60 minutes and preferably about forty minutes in a non-oxidizing atmosphere which will be in equilibrium with the carbon content of the material being sintered. The element 39, after sintering, is preferably counter-bored so that rivets 48 may be used to attach the element to a brake shoe 40 wherein the strong metal layer 44 is the portion which supports the rivets 48. The present invention not only provides strength for the relatively brittle friction layer 42 but it also provides a small degree of bendability to the element whereby the element may be conformed to a brake shoe.

In Figure 6, a finished element 40 is shown including the compressed and sintered friction layer 42 and the compressed and sintered more ductile layer 44 wherein the element 40 is attached to an iron or steel brake shoe 46 through countersunk rivets 48.

Specifically, this invention is directed to a friction element utilizing a metallic friction surface 42 similar to that dsclosed in Arnett and Ankeney application, Serial No. 540,842, now abandoned, assigned to the assignee of this application and copending herewith, wherein the friction surface is substantially ferrous in nature with a high percentage of graphite in the order of 22% and about 4% molybdenum disulfide with the remainder iron. This material may be modified with controlled quantities of lead, copper or both. The material may also include some ceramic friction controlling elements, if desired.

Some specific formulations that have proved useful are as follows wherein the percentages noted are by weight. In all cases iron makes up the remainder of the formulation.

|  | #1 | #2 | #3 | #4 | #5 | #6 | #7 | #8 |
|---|---|---|---|---|---|---|---|---|
| Graphite Powder | 20 | 20 | 25 | 20 | 20 | 22 | 20 | 20 |
| Molybdenum Disulphide Powder | 5 | 5 | 6 | 5 | 5 | 4 | 2 | 5 |
| Copper Powder | 3 | 3 |  |  | 5 |  |  | 5 |
| Lead Powder | 3 | 3 |  | 3 |  |  |  |  |
| Ceramic (Powdered Clay) |  | 1½ |  |  |  |  |  | 2 |
| Iron Powder (reduced oxide) | (1) | (1) | (1) | (1) | (1) | (1) | (1) | (1) |

[1] Remainder.

In all the above formulations, the powdered materials are of a suitable size, for example, capable of passing through 150 to 250 mesh screen as selected although powders outside this range may be used in some cases as is well known in the art.

From these formulations, it is apparent that the compositions of the friction layer may vary widely according to the specific requirements of the friction elements in its operative environment. A specific type of iron powder in either layer is preferably a reduced iron oxide powder although useful articles may be made using other commercial iron powders such as electrolytic iron, Swedish sponge iron, etc.

It is also to be understood that the more ductile layer may include small additions of other metals without departing from the spirit of the invention, for example, copper may be used to advantage to influence dimensional change during sintering as is well known in the art. Thus, copper, lead or other suitable additions may be added up to 10% to meet specific objectives.

In all cases, however, the friction element or layer is lacking in ductility and strength and necessarily requires reinforcement to permit satisfactory attachment of the same to the operating elements of a brake.

In order to accomplish this reinforcement, a friction element as described above having a nominal thickness in the order of 3/16" has bonded thereto a layer of a relatively more ductile metallic material in the thickness of about 1/16". This may vary as desired but the relation of thickness is preferred.

This more ductile material is preferably a soft iron powder (reduced iron oxide 250 mesh is suitable) mixed with graphite in quantities of from 1 to 4% and preferably 2%. The graphite addition in this instance is of considerable importance since sufficient graphite must be added to the relatively ductile layer to produce growth characteristics substantially comparable to those inherent to the friction layer. The graphite addition must also produce a condition within the relatively ductile layer so that the ductile layer and the friction layer will have substantially similar expansion characteristics upon ejection from the briquetting die. In other words, both of these layers, upon compression, have a tendency to expand when the briquette is removed from the die and it is apparent that if the combination of the two layers is to remain intact, that the expansion characeristics must be of a reasonably similar degree.

By controlling the type and quantity of graphite in the relatively ductile layer, it is possible to create conditions in this layer most favorable to briquetting and sintering in combination with the friction layer so that the two layers may be bonded during the sintering step without separation by lamination and, in fact, without appreciable lamination tendency characteristics due to differential dimensional change between the two layers. These factors are best arrived at by trial since the density of the graphite has an influence as well as the quantity thereof and, therefore, a suitable balance must be determined for the specific application as is well known in the art.

While the embodiments of the present invention as herein disclosed constitute preferred forms, it is to be understood that other forms might be adopted.

What is claimed is as follows:

1. A composite friction element for subsequent use in a clutch or brake, the combination comprising; a laminated structure comprising two layers each consisting of sintered metal powder mixtures compressed simultaneously and thereby metallurgically and coextensively bonded together at their juxtaposed surfaces, one of said layers comprising graphite in quantities of from 20% to 25%, molybdenum disulfide 2% to 6%, with at least 60% iron, the other of said layers being relatively more ductile and strong and comprising graphite 1% to 4% with the remainder being substantially all iron, said percentages being by weight of the mixture.

2. The laminated friction element claimed in claim 1 wherein a solid metal ferrous shoe is provided for supporting the element, said element being counter drilled and riveted to said shoe by headed rivets wherein the rivet heads are supported by the second mentioned layer.

3. A composite friction element for subsequent use in a clutch or brake, the combination comprising; a laminated structure comprising two layers each consisting of sintered metal powder mixtures compressed simultaneously and thereby metallurgically and coextensively bonded together at their juxtaposed surfaces, the first of said layers consisting of graphite 22%, molybdenum disulfide 4%, with the remainder being substantially all iron, the other of said layers being relatively more ductile and strong and consisting of graphite about 2%, with the remainder being substantially all iron, all of said percentages being by weight.

4. The laminated friction element claimed in claim 3 wherein a solid metal ferrous shoe is provided for supporting the element, said element being counter-drilled and riveted to said shoe by headed rivets wherein the rivet heads are supported by the second mentioned layer.

References Cited in the file of this patent

UNITED STATES PATENTS

| | | |
|---|---|---|
| 1,865,327 | McCain et al. | June 28, 1932 |
| 2,178,527 | Wellman | Oct. 31, 1939 |
| 2,191,460 | Fisher | Feb. 27, 1940 |
| 2,251,410 | Koehring et al. | Aug. 5, 1941 |
| 2,381,941 | Wellman et al. | Aug. 14, 1945 |
| 2,408,430 | Lowey | Oct. 1, 1946 |
| 2,464,517 | Kurtz | Mar. 15, 1949 |
| 2,480,076 | Marinis | Aug. 23, 1949 |
| 2,690,820 | Raes | Oct. 5, 1954 |
| 2,784,105 | Stedman | Mar. 5, 1957 |
| 2,793,427 | Marvin | May 28, 1957 |
| 2,848,795 | Lowey | Aug. 26, 1958 |
| 2,863,211 | Wellman | Dec. 9, 1958 |